US009595846B2

(12) United States Patent
Siglock et al.

(10) Patent No.: US 9,595,846 B2
(45) Date of Patent: Mar. 14, 2017

(54) AUTOMATIC TRANSFER SWITCH

(71) Applicant: Milbank Manufacturing Co., Kansas City, MO (US)

(72) Inventors: John V. Siglock, Kansas City, MO (US); Shawn J. Glasgow, Kansas City, MO (US); Andrew John Nowell, Cambridge (GB)

(73) Assignee: MILBANK Manufacturing Co., Kansas City, MO (US)

( * ) Notice: Subject to any disclaimer, the term of this patent is extended or adjusted under 35 U.S.C. 154(b) by 424 days.

(21) Appl. No.: 14/157,177

(22) Filed: Jan. 16, 2014

(65) Prior Publication Data

US 2014/0203648 A1 Jul. 24, 2014

Related U.S. Application Data

(60) Provisional application No. 61/754,307, filed on Jan. 18, 2013.

(51) Int. Cl.
*H02J 9/06* (2006.01)
*H01H 47/00* (2006.01)

(52) U.S. Cl.
CPC ............ *H02J 9/061* (2013.01); *H01H 47/004* (2013.01); *H01H 2300/018* (2013.01); *Y10T 307/615* (2015.04)

(58) Field of Classification Search
USPC ........................................................ 307/64
See application file for complete search history.

(56) References Cited

U.S. PATENT DOCUMENTS 5,289,148 A  2/1994  Siglock et al.
5,323,131 A  6/1994  Castonguay
(Continued)

FOREIGN PATENT DOCUMENTS

WO  2014113582 A1  7/2014

OTHER PUBLICATIONS

The International Bureau of WIPO, International Preliminary Report on Patentability for PCT/US2014/011878 dated May 8, 2014.
(Continued)

*Primary Examiner* — Jared Fureman
*Assistant Examiner* — Emmanuel R Dominique
(74) *Attorney, Agent, or Firm* — Polsinelli PC; Derek D. Donahoe

(57) ABSTRACT

Aspects of the present disclosure involve systems, methods, and the like, for an automatic transfer switch (ATS) of a power system. The ATS allows for switching between two or more power systems while preventing back-feeding of the power systems. To provide the safety features of the ATS, a safety circuit and control board may be implemented with the magnetic latching relays to control the actions of the latching relays and provide the switching function of the ATS. In one particular embodiment, the safety board comprises one or more electromechanical relays positioned between the controlling electronics of the control board and the magnetic latching relays. The safety board design contains measures to ensure it still functions if one of the disconnect switches is not connected, if one of the connections to a first load phase, a second load phase or neutral is lost and if the main control board is not connected.

16 Claims, 7 Drawing Sheets

(56) References Cited

U.S. PATENT DOCUMENTS

| | | | |
|---|---|---|---|
| 5,559,376 A * | 9/1996 | Tachikawa | H02J 1/10 307/18 |
| 6,292,075 B1 | 9/2001 | Connell et al. | |
| 6,320,485 B1 | 11/2001 | Gruner | |
| 6,472,965 B2 | 10/2002 | Leone et al. | |
| 6,861,596 B2 | 3/2005 | Schnackenberg | |
| 7,015,599 B2 | 3/2006 | Gull et al. | |
| 7,356,384 B2 | 4/2008 | Gull et al. | |
| 7,642,676 B2 | 1/2010 | Washington | |
| 7,692,112 B2 | 4/2010 | Deboer et al. | |
| 7,710,224 B2 | 5/2010 | Gruner et al. | |
| 7,948,117 B2 | 5/2011 | Lathrop et al. | |
| 8,067,857 B2 * | 11/2011 | Humphrey | G06F 1/263 307/82 |
| 8,279,027 B2 | 10/2012 | Brown et al. | |
| 2002/0145339 A1 * | 10/2002 | Liu | H02J 1/102 307/77 |
| 2003/0075982 A1 | 4/2003 | Seefeldt | |
| 2005/0278075 A1 * | 12/2005 | Rasmussen | H02J 9/06 700/286 |
| 2008/0054722 A1 * | 3/2008 | Phelps | H02J 9/061 307/64 |
| 2008/0080104 A1 * | 4/2008 | Yagudayev | H02J 3/40 361/20 |
| 2008/0088182 A1 | 4/2008 | Lathrop | |
| 2009/0179498 A1 | 7/2009 | Lathrop et al. | |
| 2009/0240377 A1 | 9/2009 | Batzler et al. | |
| 2010/0038966 A1 * | 2/2010 | Espeut, Jr. | H01H 9/26 307/68 |
| 2010/0225167 A1 | 9/2010 | Stair et al. | |
| 2011/0095853 A1 | 4/2011 | Connell | |
| 2012/0242145 A1 | 9/2012 | Espeut, Jr. | |

OTHER PUBLICATIONS

The International Bureau of WIPO, International Search Report and Written Opinion for PCT/US2014/011878 dated Jul. 30, 2015.

* cited by examiner

AUTOMATIC TRANSFER SWITCH

CROSS-REFERENCE TO RELATED APPLICATIONS

This application claims priority under 35 U.S.C. §119(e) to U.S. Provisional Application No. 61/754,307 entitled "AUTOMATIC TRANSFER SWITCH", filed on Jan. 18, 2013 which is incorporated by reference in its entirety herein.

TECHNICAL FIELD

Aspects of the present disclosure generally relate to systems and methods related to providing and managing utility power sources. More specifically, the present disclosure relates to an automatic transfer switch to transfer power between two separate power systems.

BACKGROUND

Automatic transfer switches (ATS) are typically used to transfer power between two different power systems. For example, an ATS may be employed to switch between power provided by a utility and power provided by a generator. The ATS provides a means for a user to effectively manage power consumption at a premises by providing the option of switching between the two (or more) power systems. However, such automatic transfer switches typically provide some protection against potentially dangerous situations, such as "back-feeding" of power at the switch location.

To prevent "back-feeding" of power, which may be dangerous to service personnel or others, the automatic transfer switches are commonly of the "open-transition" or "break before make" type. In this type of switch, the connection to one source is opened before the connection to the other source is closed. This type of switch typically employs a mechanical construction or an interlock that makes it physically impossible to provide a connection between the two sources.

The most typical switch employed in this scenario is a multi-pole bi-stable switch. Such a switch is inherently incapable of interconnecting the two power sources. One disadvantage of such a switch is its size and cost. Strong springs are usually employed to provide the force necessary to maintain contact closure pressure required during large fault currents that may occur in electrical distribution systems. If the large currents associated with these faults cause the contacts to part, destructive arcing will occur. These strong springs require large forces to force the switch toggle mechanism over-center, thereby requiring the use of large, expensive electromechanical solenoids to drive the mechanism. Another disadvantage that increases the size and therefore cost is that the contacts used by the different power sources must be physically separated sufficiently to prevent the arcing that may occur at contact opening from extending from one power source contact to the other. Minimizing this arc length requires rapid contact opening which again implies large forces required for movement.

It is with these and other issues in mind, among others, that various aspects of the present disclosure were conceived and developed.

DETAILED DESCRIPTION

Aspects of the present disclosure involve systems, methods, and the like, for an automatic transfer switch (ATS) of a power system. The ATS allows for switching between two or more power systems while preventing back-feeding of the power systems. Rather than utilizing typically high-cost switches, the ATS described herein utilizes multiple magnetic latching relays. To provide the safety features of the ATS, a "safety board" or "safety circuit" and "control board" or "control circuit" may be implemented with the magnetic latching relays to control the actions of the latching relays and provide the switching function of the ATS. In one particular embodiment, the safety board comprises one or more electromechanical relays positioned between the controlling electronics of the control board and the magnetic latching relays. In one embodiment, the safety board is a separate physical entity from the ATS control board and is mounted within the ATS enclosure. In another embodiment, the safety board circuits are incorporated into the control board circuitry. As explained in more detail below, the safety board design contains measures to ensure it still functions if one of the disconnect switches is not connected, if one of the connections to a first load phase, a second load phase or neutral is lost and if the main control board is not connected. In this manner, the safety board circuitry is single fault tolerant to provide safety features of the ATS.

Figure 1:
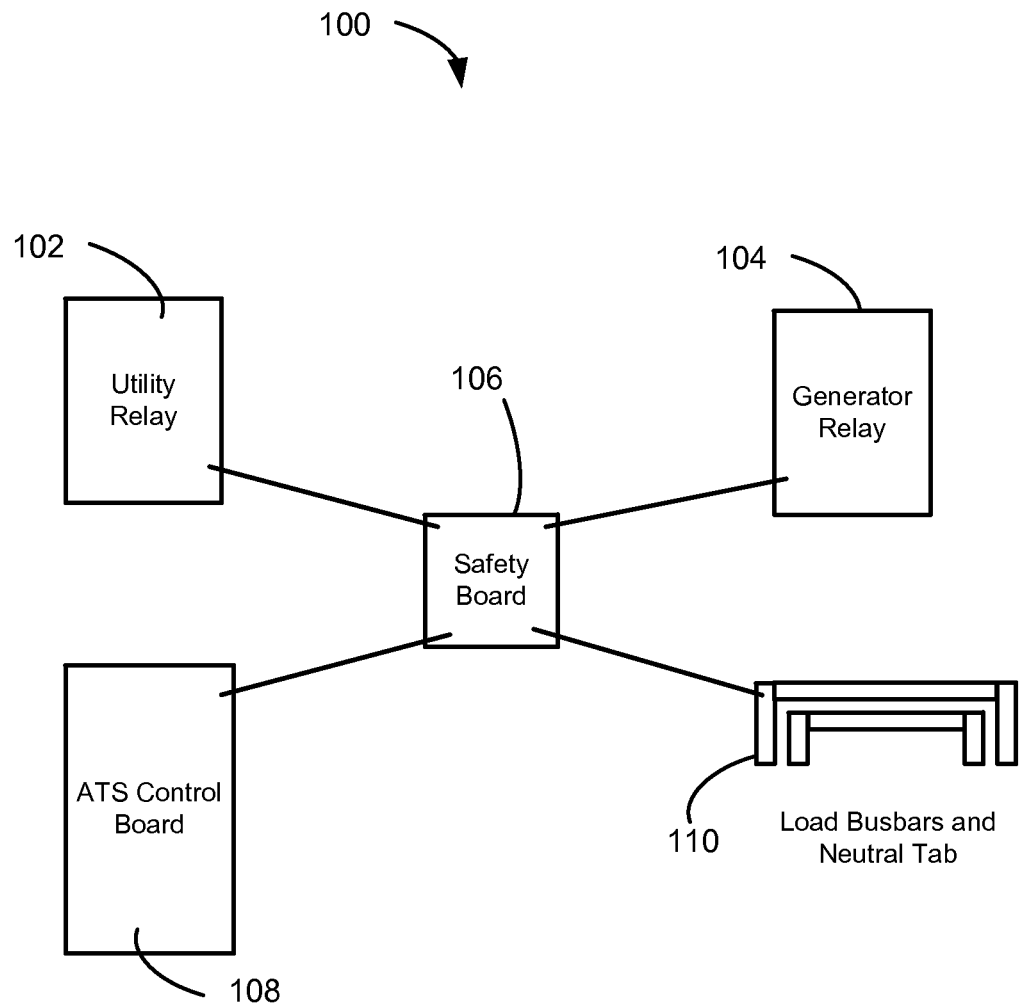
FIG. 1 is a schematic diagram illustrating an exemplary automatic transfer switch system for transferring between two power systems.

FIG. 1 is a schematic diagram illustrating an exemplary automatic transfer switch system for transferring between two power systems. The embodiment of the ATS 100 illustrated in FIG. 1 allows for switching between power provided by a generator and power provide by a utility, although any power source may be incorporated with the ATS. In general, the ATS system includes a utility magnetic latching relay 102 and a generator magnetic latching relay 104. In general, the magnetic latching relays 102, 104 provide energy to a load connected to the ATS in a closed position. Thus, a closed state of the generator latching relay provides power to the load 110 from the generator and a closed state of the utility latching relay provides power to the load from the utility. As described below, the ATS system 100 illustrated in FIG. 1 prevents both the generator and the utility from providing power to the load 110 simultaneously.

In addition, a "safety board" (or "safety board circuit" or "safety circuit") is in electrical communication with the utility latching relay 102 and the generator latching relay 104. As described in more detail below with reference to FIGS. 3 and 5, the safety board 106 includes circuitry that, in cooperation with a control circuit, manages the switching from one power source to the other. In general, the safety circuit board 106 includes one or more electromechanical relays positioned between the controlling electronics of a control board 108 and the latching relays 102, 104. In one particular embodiment, the safety board 106 includes one or more electrical components on a circuit board, the electrical components performing the functions of the safety board outlined below. In general, however, the safety board 106 may include any number of components, circuits and/or programs to perform the functions of the safety board described herein.

An "ATS control board", "control board" or "control circuit" 108 may also be in electrical communication with the safety board 106. In general, the control board 108 provides one or more control signals to the safety board 106 and/or the latching relays 102, 104 to control the operation of the ATS 100. Such control signals are described in more detail below. To provide the control signals for the ATS, the control board 108 may include any number of electronic components that form a circuit to provide said signals. In one embodiment, the control board 108 includes one or more processors and one or more memory components that store instructions that, when processed by the one or more processors, provide the control signals to the ATS 100. The components of the control board 108 are described in more detail below with reference to FIG. 6.

One or more busbars 110 or other energized components of the ATS 100 may also be connected to or otherwise associated with the safety board 106. The electrical connections of the one or more busbars 110 provide state information of the ATS 100 to the safety board 106 (and control board 108 in some implementations) for use by the boards in determining the state of the ATS. For example, the safety board 106 may determine that a particular busbar 110 is energized by at least one of the power sources and may utilize that information during the switching between the power sources to prevent a dangerous situation at the ATS 100 during the switch.

As mentioned above, the safety board 106 is in electrical communication with one or more of the components of the ATS 100. Thus, electrical signals may be transmitted between the various components of the ATS 100 and the safety board 106. Such signals are illustrated in FIG. 1 and being transmitted between the safety board 106 and the components of the ATS 100. For example, a switch status signal may be transmitted between the utility relay 102 and the safety board 106 that indicates the status of the utility relay. In another example, an "open utility switch" signal may be transmitted between the control board 108 and the safety board 106 to signal the safety board to open the utility relay 102. The various signals transmitted between the components of the ATS 100 are described in more detail below.

Figure 2A:
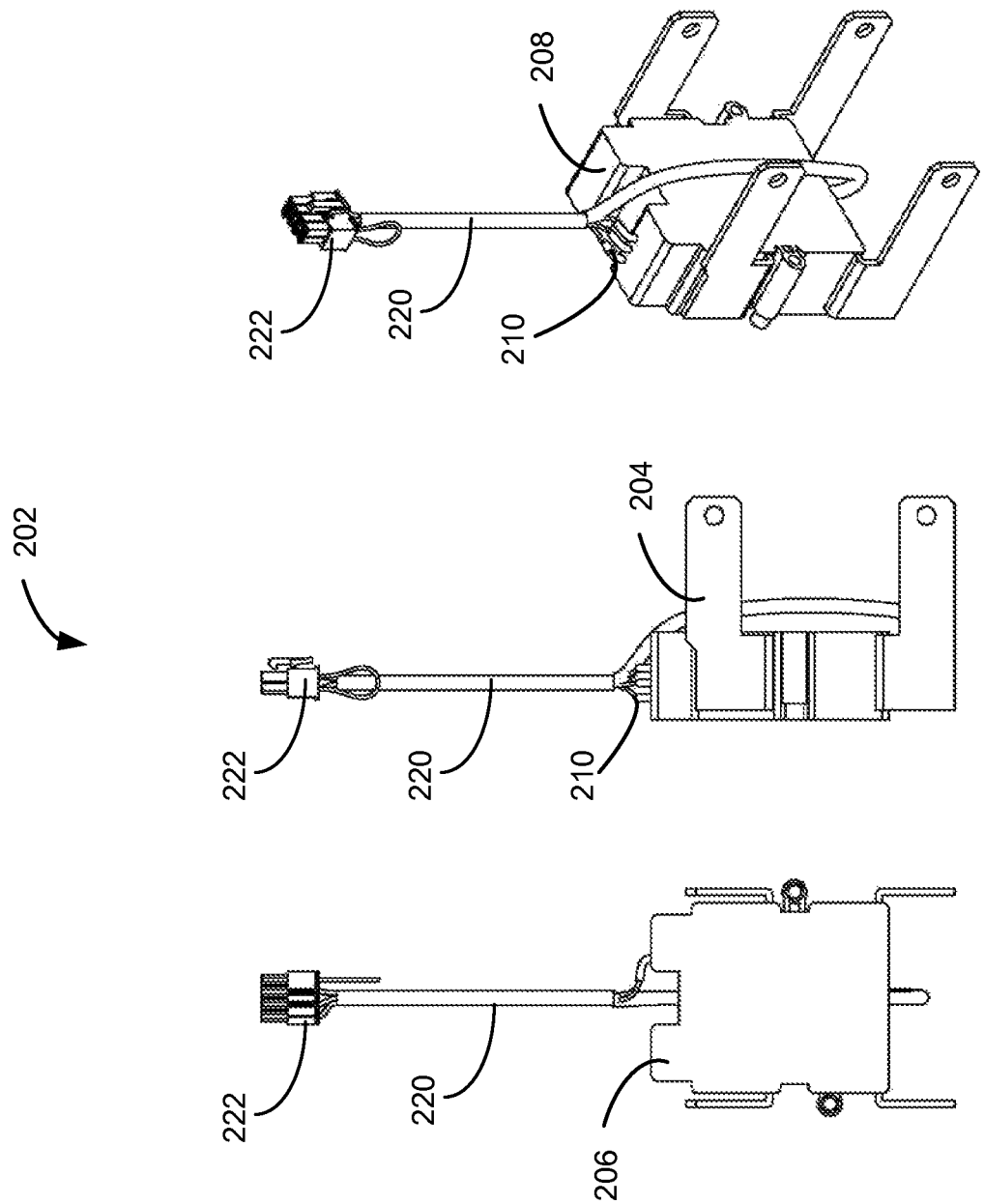
FIG. 2A illustrates various aspect views of a magnetic latching switch that may be used in an automatic transfer switch system.

FIG. 2A illustrates various aspect views of a magnetic latching switch that may be used in an automatic transfer switch system. In particular, view 204 is a side view of the magnetic latching switch 202, view 206 is a front view of the magnetic latching switch and view 208 is an isometric view of the magnetic latching switch. In the embodiment illustrated in FIG. 2A, the magnetic latching switch 202 communicates with the safety board 106 and/or the control board 108 of the ATS 100 through a communication cable 220. In this particular embodiment, the communication cable 220 includes an 8-pin connector 222 with five conducting wires within the communication cable. One example of such a connector is a Mini-Fit Jr. connector manufactured by Molex® of Lisle, Ill. In general, any type of connector may be used with the communication cable. Further, it should also be appreciated that communication between the latching switch 202 may occur through any type of communication cable with any number of conducting wires and/or through a wireless connection. The embodiment shown in FIG. 2A is but one example of the type of communication cable 220 that may be used to communicate between the components of the automatic transfer switch.

The communication cable 220 of the magnetic latch switch provides electrical transmission paths between the safety board 106 and/or the control board 108 and the magnetic latching switch 202 for transmitting one or more control signals between the components. As should be appreciated, the magnetic latching switch 202 illustrated in FIG. 2A is but one example of a latching switch that can be utilized in conjunction with the ATS. In general, any electrical component that provides a latch switch that is controllable through one or more control signals to energize a load from a power source may be utilized in the ATS.

Figure 2B:
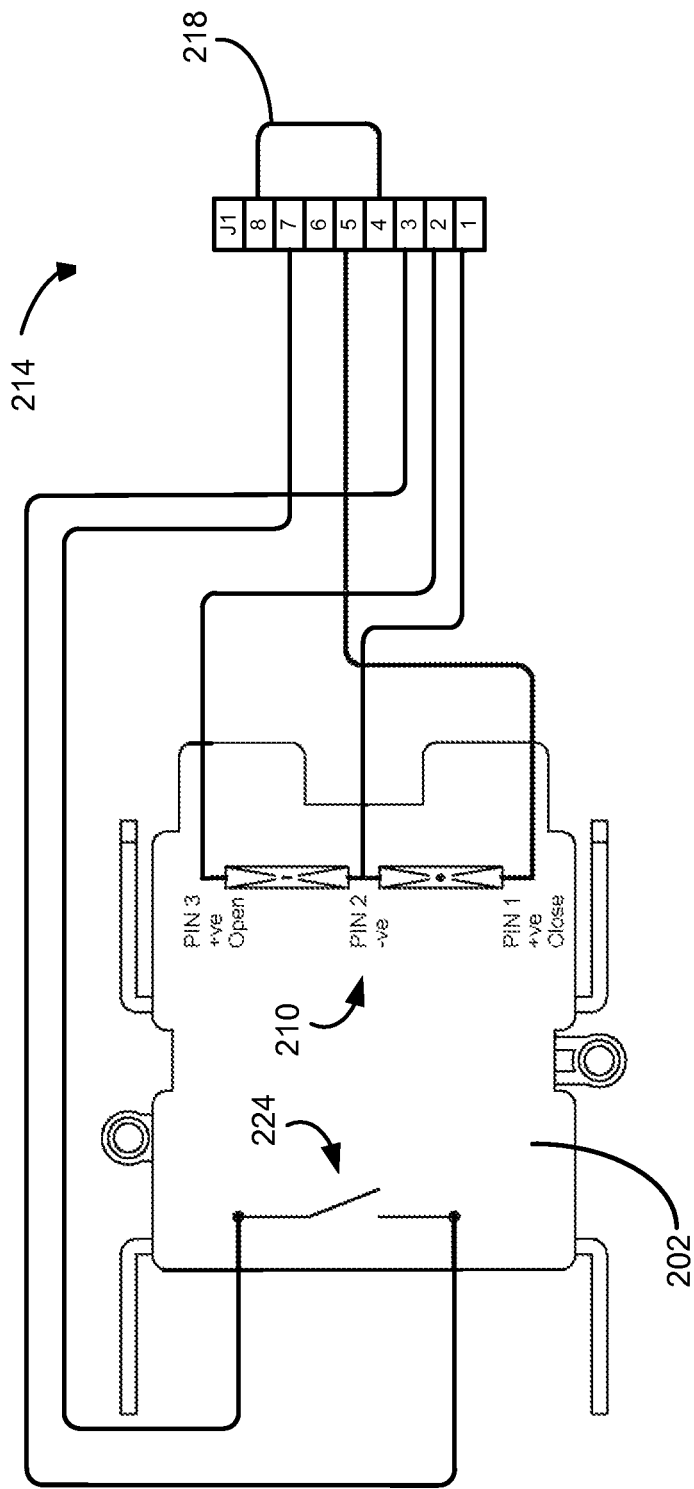
FIG. 2B is a schematic diagram of the magnetic latching switch of FIG. 2A.

FIG. 2B is a schematic diagram of the magnetic latching switch of FIG. 2A illustrating the connectors of the magnetic latching switch. In particular, FIG. 2B includes a connection diagram 214 for the magnetic latching switch. In one embodiment, the magnetic latching switch 202 may include eight connectors. In one embodiment of the connection diagram, connectors 5, 1, and 2 of the connection diagram 214 are electrically connected to connectors 210 and connectors 7 and 3 of the connection diagram are electrically connected to an internal switch 224 within the latching switch. In addition, connectors 4 and 8 may be connected together to provide a safety feature of the magnetic latching switch through one or more power interlock connectors 218. The power interlock connectors 218 of the magnetic latching switch 206 prevent the closing operation of the other magnetic latching switch in the ATS. This is because the signal connectors are used for a position sensing device in the magnetic latching switch. Since one state of this position sensing device may be represented by an open circuit, it is essential to provide verification that the sensor is actually connected. Control of the magnetic latching switch to connect or disconnect the power source is determined by one or more control signals present on the signal connectors.

Figure 3:
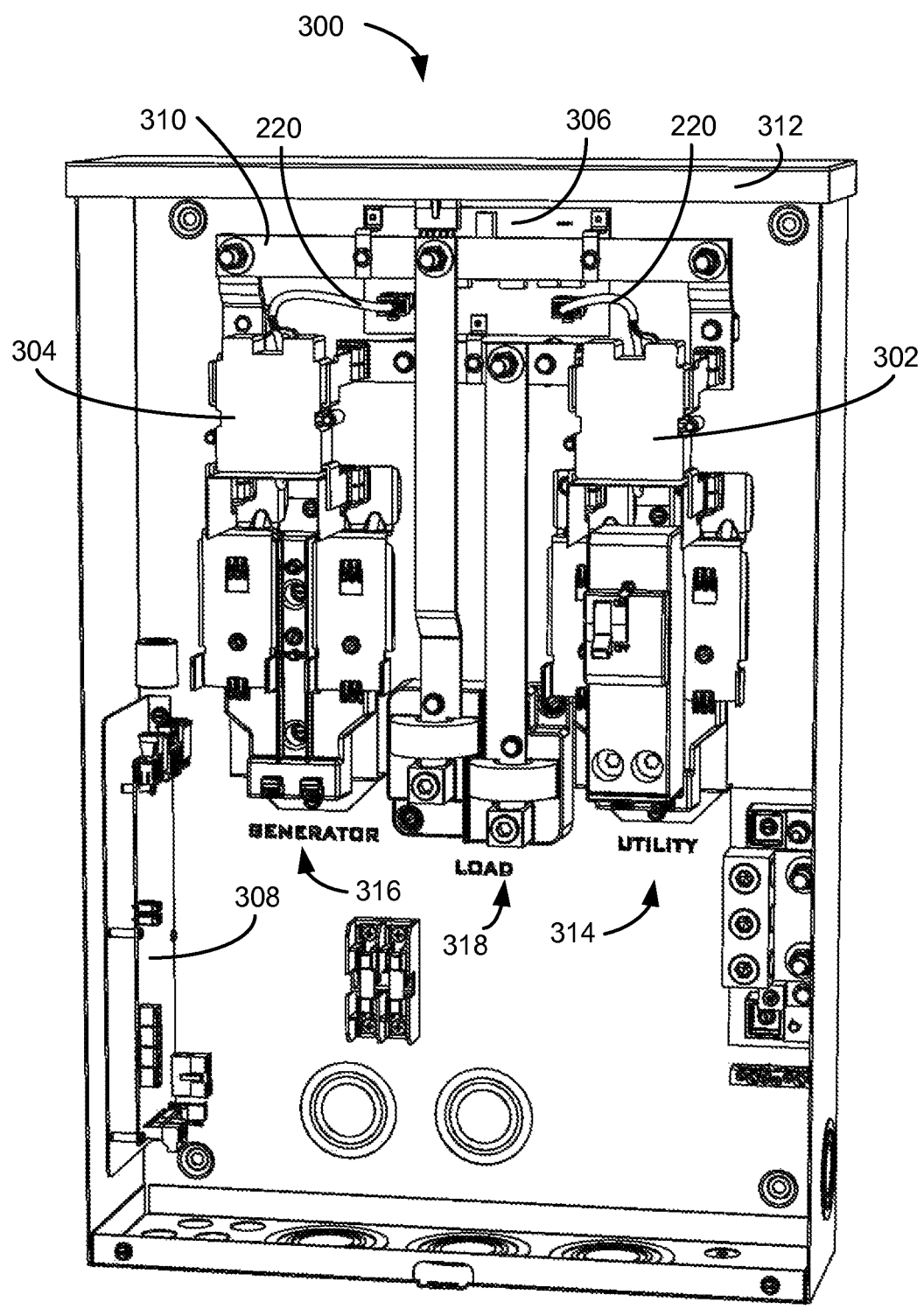
FIG. 3 is a front view of an automatic transfer switch.

FIG. 3 is a front view of one embodiment of an automatic transfer switch 300. As explained above, the ATS operates to provide a switch between two power sources, shown in FIG. 3 as a generator source and a utility source, although any type of power source may be used. In general, the ATS includes an enclosure 312 that houses the components of the ATS 300 as well as connection points for the power sources 314, 316 and the load 318 being energized by the selected power source. The power sources and load may connect to the ATS 300 through standard connection techniques for connecting high-voltage power sources.

Also included in the ATS 300 are the components that comprise the ATS switching system as illustrated in FIG. 1. Similar components between those illustrated in FIG. 1 and those illustrated in FIG. 3 have similar numbering structures. Thus, the ATS 300 of FIG. 3 includes a utility magnetic latching relay 302 connected in series between the utility power source and the load connection 318 such that the latching relay can turn on or turn off the utility power to the load. Similarly, a generator magnetic latching relay 304 is connected between the generator power source and the load connection 318 such that the latching relay can turn on or turn off the generator power to the load. As mentioned above, these latching relays or latches are controlled through one or more control signals provided to the latches.

To provide the control signals to the latching relays 302, 304, a safety board 306 or safety circuit is also included in the ATS 300. To communicate with the latching relays 302, 304, one or more communication lines 220 may be connected between the safety board 306 and the latching relays, although not shown in FIG. 3. In another embodiment, the safety board 306 may transmit the control signals to the latching relays 302, 304 wirelessly. Further, the ATS 300 includes one or more load busbars 310 in communication or directly connected to the safety board 306. In one embodiment, the load busbar 310 provides an indication of a state of the utility latch 302 and the generator latch 304.

Also included in the ATS 300 is a control board 308. Similar to the safety board 306, the control board provides one or more control signals to the safety board and/or the utility magnetic latching relay 302 and the generator magnetic latching relay 304 to control the operation of the ATS. For example, the control board 308 may provide an open or close control signal to the latches 302, 304. Thus, although not shown in FIG. 3, one or more communication lines may be present between the control board 308 and the other components of the ATS to carry the one or more control signals. Also, in one embodiment, the control board 308 may communicate with such components wirelessly.

Figure 4:
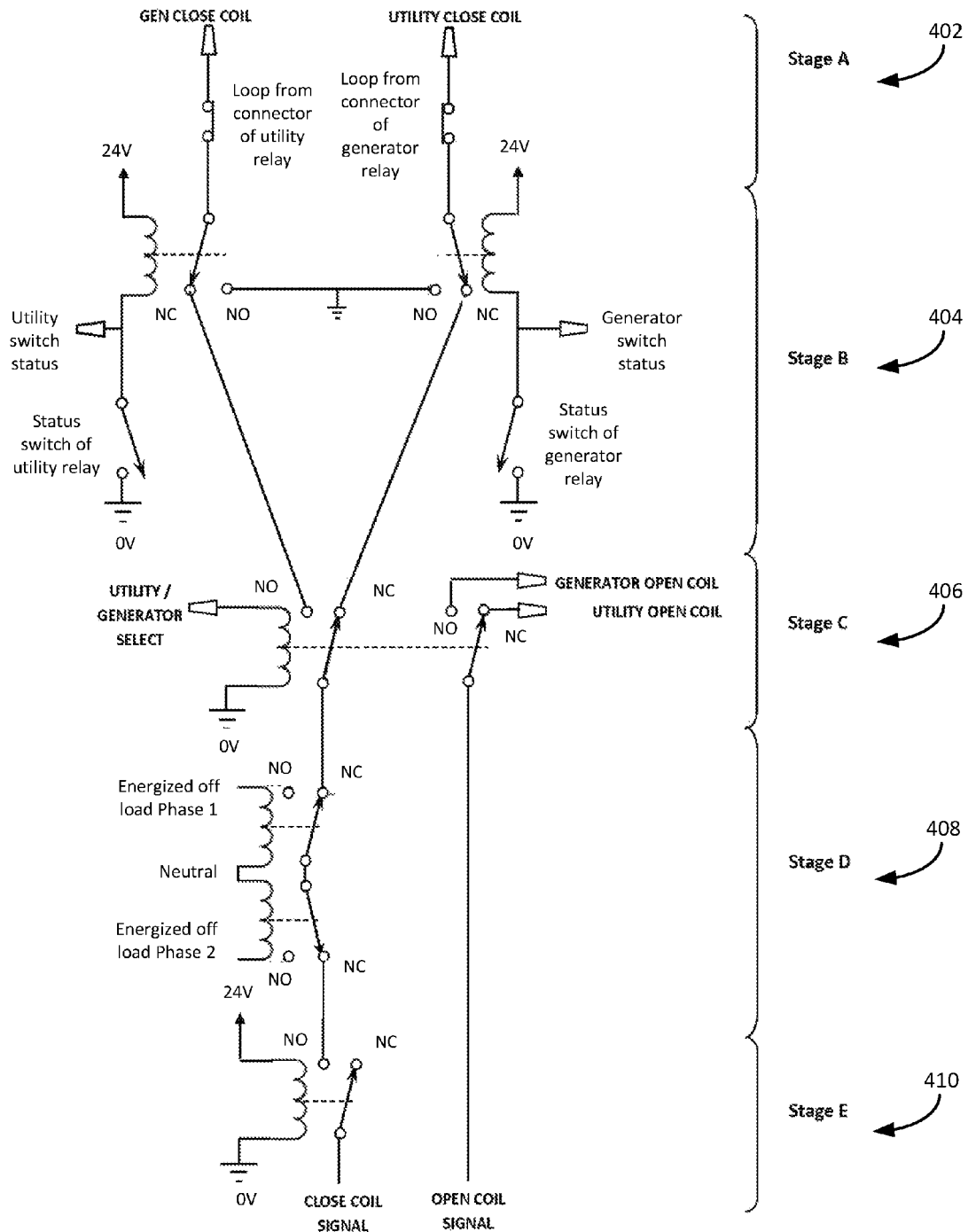
FIG. 4 is a topology diagram of a safety board circuit for an automatic transfer switch system.
Figure 5:
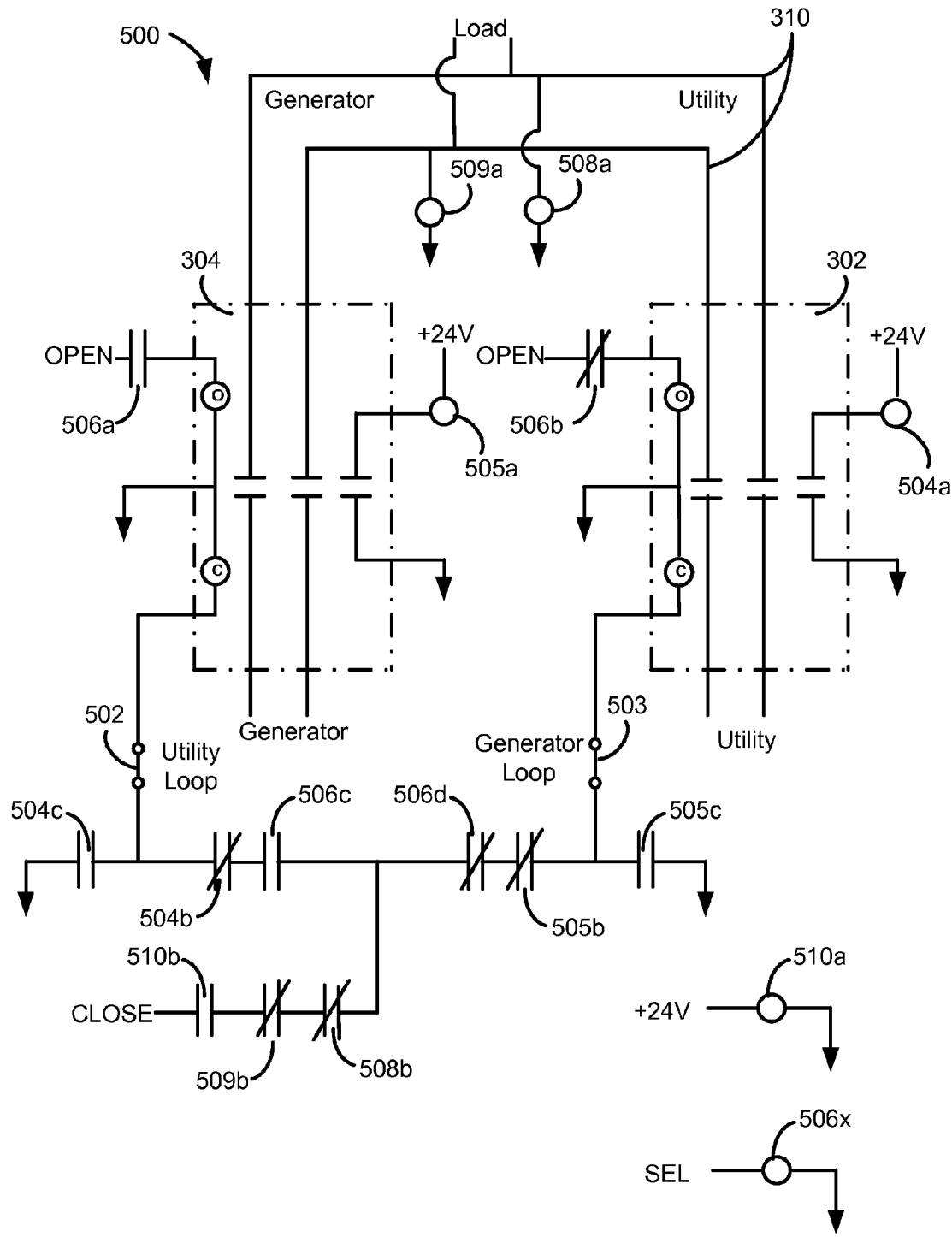
FIG. 5 is a schematic diagram illustrating an automatic transfer switch system.

The operation of the ATS is now described in relation to FIGS. 4 and 5. FIG. 4 is a topology diagram of a safety board circuit for an automatic transfer switch system and FIG. 5 is a schematic diagram illustrating an automatic transfer switch system. In particular, the Figures illustrate the various safety features of the ATS system that prevent the back-feed of power during a switch from one power source to another. The various safety features are shown in FIG. 4 as stages A-E. Reference is made between FIG. 4 and FIG. 5 during the discussion of the stages of the ATS switch below.

As shown in FIG. 5, the various stages of safety features present in the ATS 500 act to prevent unsafe conditions at the ATS. As described above, the ATS 500 includes a generator magnetic latching switch 304 and a utility magnetic latching switch 302. Connected between the latching switches 302, 304 are load busbars 310. The control of the latching switches 302, 304 occurs through various relays controlled by a safety board and a control board. In particular, the control board provides signals to the ATS 500, such as an OPEN signal, a CLOSE signal, a generator/utility select signal and a 24 volt power signal. The OPEN signal and CLOSE signal are provided to the latching switches 302, 304 to open or close the switch accordingly. The generator/utility select signal selects which of the two generator or utility switch receives the OPEN and CLOSE signal.

Beginning in stage A 402 as illustrated in FIG. 4, a safety feature to ensure safety of the ATS in the event of an incorrect or missing wiring is shown. In particular, a wire loop between two connectors in each of the magnetic latching relays of the ATS provides a failsafe for the disconnect switch of each relay. For example, as shown in FIG. 2B, connectors 4 and 8 of the magnetic latch relay may be connected together through wire or jumper 218. The wire connection 218 of the utility latching relay completes the disconnect path for the generator latching relay such that the generator disconnect switch cannot be closed unless the utility disconnect switch is physically connected to the safety board. Similarly, the wire connection 218 of the generator latching relay completes the disconnect path for the utility latching relay such that the utility disconnect switch cannot be closed unless the generator disconnect switch is physically connected to the safety board. As stated, the use of the wire loops prevents use of the switch in the event of an incorrect or missing wiring.

The stage A 402 safety feature is illustrated in FIG. 5 as utility loop 502 and generator loop 503. As shown in the circuit 500, the utility loop 502 is connected in series in the disconnect path for the generator latching relay 304 such that a missing utility loop prevents the generator latching relay disconnect switch from closing. Similarly, the generator loop 503 is connected in series in the disconnect path for the utility latching relay 302 such that a missing utility loop prevents the utility latching relay disconnect switch from closing.

Returning to FIG. 4, stage B 404 of the ATS provides a status switch for each of the generator and utility magnetic latches that follows the status of the switch. For example, if the utility latch is closed, the status switch for the utility magnetic latch is similarly closed. A similar construction is included for the generator latch such that, if the generator latch is closed, the status switch for the generator is similarly closed. Referring now to FIG. 5, the respective status switches for the utility and generator latches are used to provide a safety feature (stage B 404) for the ATS. In particular, the utility status switch 504a is inverted by a utility status switch relay connected to the utility latch 302 and placed in the path of the generator CLOSE signal 504b. Thus, if the utility switch is closed, the utility status switch is similarly closed, the inversion of which would cause utility status switch relay 504b to be open, thereby breaking the path of the generator CLOSE signal. Additionally, utility status switch 504c is also closed, thus insuring no potential can be applied across the generator relay close coil. In other words, the generator switch 304 cannot receive a CLOSE signal from a controller to close the generator latch 304 if the status of the utility switch 504 is closed.

Similarly, the generator status switch 505a is inverted by a generator status switch relay 505b connected to the generator latch 304 and placed in the path of the utility close signal. Thus, if the generator switch is closed, the generator status switch 505a is similarly closed, the inversion of which would cause generator status switch relay 505b to be open, thereby breaking the path of the utility CLOSE signal. In addition, utility status switch 505c will be closed, thus insuring no potential can be applied across the utility relay close coil. In other words, the utility switch 302 cannot receive a CLOSE signal from a controller if the generator status switch 505a is closed. The operation of utility status switch relay 504a-c and generator status switch relay 505a-c in relation to the switch status of the utility and generator switch operate to prevent the connection, or closing, of one latch if the other latch is already closed or connected.

In stage C 406, a single output signal from the control board operates to drive both the generator and utility latches. In general, the control board of the ATS provides a control signal to close either the generator latch or the utility latch such that only one of the latches can be closed at any given time. This functionality is illustrated in the circuit of FIG. 5 through relays 506a-506d. In practice, relays 506a-506d may be a single relay device with multiple outputs, either inverted or non-inverted. However, relays 506a-506d may be any number of components that perform the operations of a relay based on an input signal. During operation, the control board provides a select signal to relays 506a-506d to select either the generator latch 304 or the utility latch 302 to receive the control signal for the latch. In the embodiment illustrated in FIG. 5, an asserted control signal selects the generator latch 302 to receive a control signal, while a deasserted select signal selects the utility latch 304 to receive a control signal. For example, an asserted select signal received at relays 506a-506d would cause relays 506b and 506d to open, thereby preventing the utility latch 302 to receive an OPEN or CLOSE control signal. Alternatively, relays 506a and 506c would close on an asserted select signal provided by the control board such that the generator latch 304 can receive an OPEN or CLOSE control signal from the board. In this manner, a single select signal provided by the control board or safety board selects which latch 302, 304 receives the OPEN or CLOSE control signal to control the opening and closing of the latches.

The operation of stage C 406 ensures that only one latch can be controlled at a time, while further enforcing the interlocking of state B 404 described above. For example, in the situation where both latches are open and a CLOSE signal is provided to each latch at the same time (thereby bypassing the interlocking of the status switches described above), only one of the latches would receive the CLOSE signal based on the select signal provided to relays 506a-506d.

The stage D 408 safety feature relies on relays energized by a load busbar 310 to prevent a latch 302, 304 from receiving a CLOSE signal when the load busbar is energized. In particular and shown best in FIG. 5, a first phase relay 508a is energized by a first load phase and a neutral connection. A second phase relay 509a is energized by a second load phase and neutral. As illustrated in FIG. 5, the phase relays include an energizing portion (shown as a circle in the circuit diagram) and a latching portion (shown as a latch diagram). For example, first phase relay includes an energizing portion 508a near the top of the diagram between a first load phase signal and a neutral connection and a latch portion 508b in series in the CLOSE signal line. Thus, when the first phase relay energizing portion 508a is energized by power on the first load phase busbar 310, the latch portion 508b responds accordingly. In a similar manner, relays 504a-b, 505a-b, 509a-b and 510a-b include an energizing portion and a latching portion.

In use, the CLOSE signal is connected in series with the contacts of the first phase relay 508b and the second phase relay 509b. The first phase relay 508a-b and second phase relay 509a-b are normally closed relays such that, if either relay is energized by voltage present on the load busbar 310, the relay is opened and the CLOSE signal path is broken. In the instance when the load busbar 310 is energized (meaning that one of the power sources are providing power to the load), a CLOSE control signal cannot be sent to either magnetic latching switch 302, 304.

In stage E 410, one or more relays are utilized by the ATS to determine a strong 24 volt signal from the control board to the safety board and latching switches. In one embodiment, certain safety features, such as the interlocking feature of stage B 404 relies on a 24 volt connection from the control board. Thus, in stage E 410, a power detect relay 510a-b associated with the 24 volt signal from the control board may be connected in series in the CLOSE signal path to the latches 302, 304. The power detect relay 510a-b is configured such that when the 24 volt signal is not present at the relay, the relay opens and the CLOSE signal path is broken. In this manner, a CLOSE control signal cannot be received at either latch 302, 304 if a bad or missing 24 volt signal is detected from the control board.

The various stages of safety features described above are implemented through the safety board of the ATS 500. For example, an OPEN signal is received at either latch 302, 304 based on the select signal controlling relays 506a and 506b. In particular, an asserted select signal allows for relay 506a to close (and relay 506b to open) allowing for the OPEN signal to be received at the generator latch 304. Alternatively, a deasserted select signal allows for relay 506b to close (and relay 506a to open) allowing for the OPEN signal to be received at the utility latch 302.

To receive a CLOSE signal from the control board, several safety features or stages are provided in the ATS 500. For example, the CLOSE signal is connected in series to a power detect relay 510 that is only closed (thereby providing transmission of the CLOSE signal) if a 24 volt signal is received at the relay from the control board. This is illustrated as stage E 410 of FIG. 4. Additionally, a first phase relay 508a-b and a second phase relay 509a-b are connected in series in the CLOSE signal path. These relays 508a-b, 509a-b are opened if either phase of the load busbar 310 is energized, as illustrated in stage D 408 of FIG. 4.

The select signal from the control board also controls relays in the CLOSE signal path. More particularly, an asserted select signal (detected at switch relay 506x) allows for relay 506c to close (and relay 506d to open) allowing for the CLOSE signal to be present on the CLOSE signal path to generator latch 304. A deasserted select signal 506x allows for relay 506d to close (and relay 506c to open) allowing the CLOSE signal to be present on the CLOSE signal path to utility latch 302. This is illustrated as stage C 406 of FIG. 4. Further, the CLOSE signal path to each latch 302, 304 also includes a status switch relay 504a-b, 505a-b that is the inverse of a status switch associated with each latch that mirrors the status of each latch. For example, a utility status switch 504a is closed when the utility latch 302 is closed. A closed utility status switch opens the utility status switch relay 504b in the CLOSE signal path to the generator latch 304 such that the generator latch cannot receive a CLOSE signal while the utility latch (and the utility status switch) remain closed. A similar generator status switch relay 505a-b prevents the utility latch from receiving a CLOSE signal while the generator latch 304 is closed. This is illustrated in FIG. 4 as stage B 404.

Also, a utility loop 502 is connected in series in the disconnect path for the generator latching relay 304 such that a missing utility loop prevents the generator latching relay disconnect switch from closing. Similarly, the generator loop 503 is connected in series in the disconnect path for the utility latching relay 302 such that a missing utility loop prevents the utility latching relay disconnect switch from closing. This is illustrated as stage A 402. Through the various stages of the ATS 500, back feeding of a power source to the load during switching is prevented.

Figure 6:
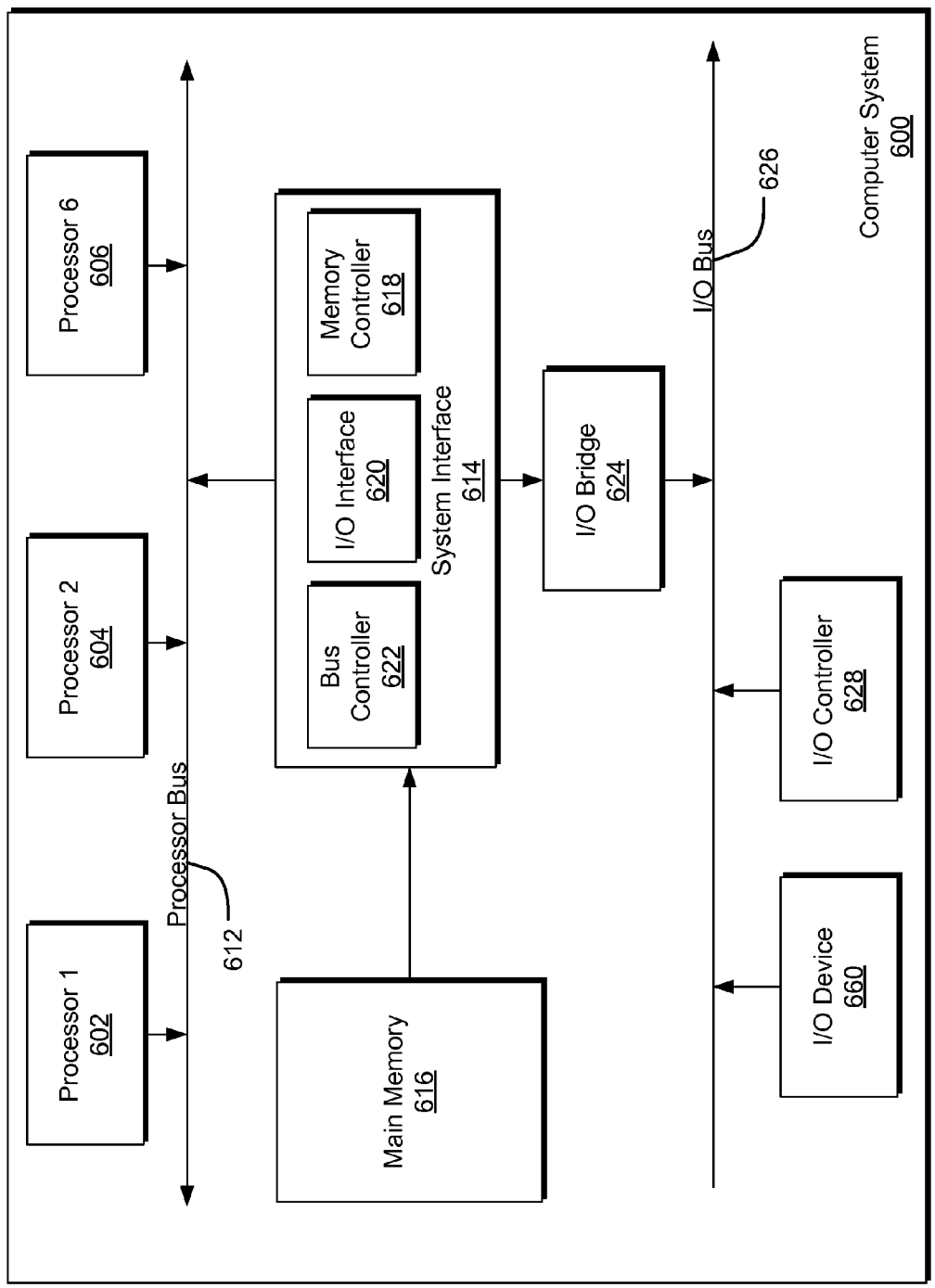
FIG. 6 is an exemplary control board configuration for performing one or more of the operations of an automatic transfer switch system.

As mentioned above, the control board (or control circuit) of the ATS system may provide one or more control signals to control the operation of the ATS. FIG. 6 is a block diagram illustrating an example of a control board 600 which may be used in implementing embodiments of the present disclosure. The control board includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. Processors 602-606 may also be purpose built for processing/mixing media data, such as audio or video components of a media stream, such as a digital switch processor. System interface 614 may be connected to the processor bus 612 to interface other components of the board 600 with the processor bus 612. For example, board interface 614 may include a memory controller 616 for interfacing a main memory 616 with the processor bus 612. The main memory 616 typically includes one or more memory cards and a control circuit (not shown). System interface 614 may also include an input/output (I/O) interface 620 to interface one or more I/O bridges or signals with the processor bus 612.

Control board 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. Control board 600 may include a read only memory (ROM) and/or other static storage device coupled to the processor bus 612 for storing static information and instructions for the processors 602-606. The control circuit set forth in FIG. 6 is but one possible example of a system that may employ or be configured in accordance with aspects of the present disclosure.

According to one embodiment, the above techniques may be performed by the control board 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

In addition to providing the control signals for the ATS, the control board may perform several other functions related to the performance and monitoring of one or more power sources connected to the ATS. For example, the National Electric Code requires that generators used for optional standby power either be capable of operating the entire load or have means to limit the connected load to that which the generator can supply. A typical residence with 240 volt service at 200 amperes could consume a maximum of 48,000 VA or 38,400 VA continuously (80% of maximum). This same residence may only consume 10,000 to 15,000 VA if some circuits could be disabled or only permitted when other loads were at a low level.

Typically air conditioning and heating loads (resistance heating and water heating) are candidates for control because they require large amounts of power and because they may be "deferred" without substantial inconvenience. Most solutions to this problem use current transformers to measure the generator current and compare the current consumed to the maximum current rating of the generator. Some provide the protection without the use of current transformers by monitoring the frequency of the generator as the generator frequency is reduced at high load.

In one configuration of the control board, current transformers measure the load current delivered to the premises, which may be either the generator or the utility or any other type of power source. Additional circuitry measures the actual power consumed, not just the current. This takes into account the reactive portion of the load, allowing larger loads to be connected. It also permits optional communication of the power being consumed to the user. This may be advantageous during prolonged outages when knowledge of power use may permit a better utilization of loads. Additionally, it provides an indication of the power being consumed when utility power is used. Awareness of power consumption is believed to result in more judicious use of appliances leading to lower consumption, lower utility bills and to conservation.

Yet another embodiment of the control board provides a more efficient utilization of the generator power. Prior art methods employ a single parameter to determine if the generator will be overloaded. Simple current transformers are used on generator lines and the current transformer output is scaled, rectified and filtered. In converting the AC current levels to average DC levels the selection of the filter time constant can have significant impact. If the time constant is too short, brief current excursions may result in loads being needlessly shed or deferred. If the time constant is too long, the generator may be overloaded and shut itself down. In another method, the frequency is calculated by measuring the generator voltage. Additionally, the energy content of the fuel (commonly natural gas, propane or diesel fuel) varies. This means that the power that may be derived from the generator must necessarily vary also. Therefore simply comparing the filtered DC current levels to the generator rating will result in either unused capacity or unnecessary generator shut downs due to overload. The present disclosure of the control board uses a combination of overload detection parameters that include power, frequency and voltage. This is advantageous because generators are mechanical devices with varying rotating mass, inertia, and control system time constants. These generators must employ feedback loops to maintain their frequency and their output voltage.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

We claim:

1. A system for an automatic transfer switch, the system comprising:
   a first power source connection electrically connected to a first power source;

a second power source connection electrically connected to a second power source;

a first electromagnetic latch connected between the first power source and a load;

a second electromagnetic latch connected between the second power source and a load;

a safety circuit in electrical communication with the first electromagnetic latch and the second electromagnetic latch, the safety circuit comprising a plurality of loop connections and a plurality of serially connected safety stage circuits each comprising at least one electromechanical relay in electrical communication with the first electromagnetic latch or the second electromagnetic latch; and a control circuit in electrical communication with the safety circuit, the control circuit configured to provide one or more control signals comprising an OPEN signal to the first electromagnetic latch, an OPEN signal to the second electromagnetic latch and a CLOSED signal to control the operation of the first electromagnetic latch and the second electromagnetic latch;

wherein the safety circuit further comprises a first stage comprising a first loop connection in electrical communication between the CLOSED signal from the control circuit and the first electromagnetic latch and a second loop connection in electrical communication between the CLOSED signal from the control circuit and the second electromagnetic latch.

2. The system of claim 1 wherein the safety circuit further comprises a second stage, wherein the second stage comprises:

a first status switch relay in electrical communication with the first electromagnetic latch and connected in series between the CLOSED signal from the control circuit and the second electromagnetic latch such that when the first electromagnetic latch is closed, the first status switch relay is open to prevent the CLOSED signal from being received at the second electromagnetic latch.

3. The system of claim 2 wherein the second stage further comprises:

a second status switch relay in electrical communication with the second electromagnetic latch and connected in series between the CLOSED signal from the control circuit and the first electromagnetic latch such that when the second electromagnetic latch is closed, the second status switch relay is open to prevent the CLOSED signal from being received at the first electromagnetic latch.

4. The system of claim 1 wherein the control signal of the control circuit further comprises an electromagnetic latch select signal and the safety circuit further comprises a third stage, wherein the third stage comprises:

a first select switch relay in electrical communication between the OPEN signal to the first electromagnetic latch and the first electromagnetic latch and a second select switch relay in electrical communication between the CLOSE signal and the first electromagnetic latch, wherein an asserted electromagnetic latch select signal from the control circuit operates to allow the first electromagnetic latch to receive the OPEN signal to the first electromagnetic latch and the CLOSE signal.

5. The system of claim 4 wherein the third stage further comprises:

a third select switch relay in electrical communication between the OPEN signal to the second electromagnetic latch and the second electromagnetic latch and a fourth select switch relay in electrical communication between the CLOSE signal and the second electromagnetic latch, wherein a de-asserted electromagnetic latch select signal from the control circuit operates to allow the second electromagnetic latch to receive the OPEN signal to the second electromagnetic latch and the CLOSE signal.

6. The system of claim 1 wherein the safety circuit further comprises a fourth stage, wherein the fourth stage comprises:

a load first phase relay electrically connected to a first load phase busbar and connected in series between the CLOSED signal from the control circuit and the first electromagnetic latch and the second electromagnetic latch such that when the load first phase relay is energized by the first load phase busbar, the load first phase relay is open to prevent the CLOSED signal from being received at the first electromagnetic latch and the second electromagnetic latch; and a load second phase relay electrically connected to a second load phase busbar and connected in series between the CLOSED signal from the control circuit and the first electromagnetic latch and the second electromagnetic latch such that when the load second phase relay is energized by the second load phase busbar, the second first phase relay is open to prevent the CLOSED signal from being received at the first electromagnetic latch and the second electromagnetic latch.

7. The system of claim 1 wherein the safety circuit further comprises a fifth stage, wherein the fifth stage comprises:

a power status switch relay electrically connected to a power signal from the control board and connected in series between the CLOSED signal from the control circuit and the first electromagnetic latch and the second electromagnetic latch such that when the power status switch relay is energized by the power signal, the power status switch relay is closed to allow the CLOSED signal to be received at the first electromagnetic latch and the second electromagnetic latch.

8. An automatic power transfer switch comprising:

a first power source connection electrically connected to a first power source;

a second power source connection electrically connected to a second power source;

a first electromagnetic latch connected between the first power source and a load;

a second electromagnetic latch connected between the second power source and a load;

a safety circuit in electrical communication with the first electromagnetic latch and the second electromagnetic latch, the safety circuit comprising a plurality of loop connections and a plurality of serially connected safety stage circuits each comprising at least one switch relay configured to prevent an electrical connection between the first power source and the load and the second power source and the load simultaneously; and a control circuit in communication with the safety circuit, the control circuit configured to provide one or more control signals comprising an OPEN signal to the first electromagnetic latch, an OPEN signal to the second electromagnetic latch, a latch select signal, and a CLOSED signal to the plurality of serially connected safety stage circuits of the safety circuit to control the operation of the first electromagnetic latch and the second electromagnetic latch;

wherein the at least one switch relay comprises a first status switch relay in electrical communication with the first electromagnetic latch and connected in series between the CLOSED signal from the control circuit and the second electromagnetic latch such that when the first electromagnetic latch is closed, the first status switch relay is open to prevent the CLOSED signal from being received at the second electromagnetic latch.

9. The automatic power transfer switch of claim 8 wherein the control circuit comprises a processor and at least one memory device storing one or more computer-implemented instructions that, when executed by the processor, cause the control circuit to provide one or more control signals to the safety circuit.

10. The automatic power transfer switch of claim 8 wherein the control circuit is in wireless communication with the safety circuit to provide the one or more control signals to the safety circuit wirelessly.

11. The automatic power transfer switch of claim 8 wherein the at least one switch relay further comprises:
a second status switch relay in electrical communication with the second electromagnetic latch and connected in series between the CLOSED signal from the control circuit and the first electromagnetic latch such that when the second electromagnetic latch is closed, the second status switch relay is open to prevent the CLOSED signal from being received at the first electromagnetic latch.

12. The automatic power transfer switch of claim 11 wherein the at least one switch relay further comprises:
a first select switch relay in electrical communication between the OPEN signal to the first electromagnetic latch and the first electromagnetic latch and a second select switch relay in electrical communication between the CLOSE signal and the first electromagnetic latch, wherein an asserted electromagnetic latch select signal from the control circuit operates to allow the first electromagnetic latch to receive the OPEN signal to the first electromagnetic latch and the CLOSE signal.

13. The automatic power transfer switch of claim 12 wherein the at least one switch relay further comprises:
a third select switch relay in electrical communication between the OPEN signal to the second electromagnetic latch and the second electromagnetic latch and a fourth select switch relay in electrical communication between the CLOSE signal and the second electromagnetic latch, wherein a de-asserted electromagnetic latch select signal from the control circuit operates to allow the second electromagnetic latch to receive the OPEN signal to the second electromagnetic latch and the CLOSE signal.

14. The automatic power transfer switch of claim 13 wherein the at least one switch relay further comprises:
a load first phase relay electrically connected to a first load phase busbar and connected in series between the CLOSED signal from the control circuit and the first electromagnetic latch and the second electromagnetic latch such that when the load first phase relay is energized by the first load phase busbar, the load first phase relay is open to prevent the CLOSED signal from being received at the first electromagnetic latch and the second electromagnetic latch.

15. The automatic power transfer switch of claim 14 wherein the at least one switch relay further comprises:
a load second phase relay electrically connected to a second load phase busbar and connected in series between the CLOSED signal from the control circuit and the first electromagnetic latch and the second electromagnetic latch such that when the load second phase relay is energized by the second load phase busbar, the second first phase relay is open to prevent the CLOSED signal from being received at the first electromagnetic latch and the second electromagnetic latch.

16. The automatic power transfer switch of claim 15 wherein the at least one switch relay further comprises:
a power status switch relay electrically connected to a power signal from the control board and connected in series between the CLOSED signal from the control circuit and the first electromagnetic latch and the second electromagnetic latch such that when the power status switch relay is energized by the power signal, the power status switch relay is closed to allow the CLOSED signal to be received at the first electromagnetic latch and the second electromagnetic latch.

* * * * *